United States Patent [19]
MacIntosh, Jr. et al.

[11] Patent Number: 6,053,612
[45] Date of Patent: Apr. 25, 2000

[54] MULTI-PURPOSE EYEGLASS RETAINER

[75] Inventors: Charles M. MacIntosh, Jr., Middleboro, Mass.; Ernest P. Giordano, Riverside, R.I.

[73] Assignee: The Hilsinger Company L.P., Plainville, Mass.

[21] Appl. No.: 09/422,489

[22] Filed: Oct. 21, 1999

[51] Int. Cl.⁷ .................................................. G02C 3/00
[52] U.S. Cl. ........................................ 351/157; 351/156
[58] Field of Search .................................. 351/157, 156, 351/121, 111, 158, 41

[56] References Cited

U.S. PATENT DOCUMENTS

| | | | |
|---|---|---|---|
| D. 408,346 | 12/1998 | Roberts | D16/339 |
| 3,827,790 | 8/1974 | Wenzel | 351/123 |
| 3,874,776 | 4/1975 | Seron | 351/123 |
| 4,476,703 | 10/1984 | Enghofer | 351/123 |
| 4,743,105 | 5/1988 | Tabacchi | 351/156 |
| 4,790,646 | 12/1988 | Seron | 351/156 |
| 4,976,531 | 12/1990 | Kahaney | 351/156 |
| 5,015,085 | 5/1991 | May | 351/43 |
| 5,087,118 | 2/1992 | Gill | 351/156 |
| 5,664,291 | 9/1997 | Stoller | 24/3.3 |
| 5,805,262 | 9/1998 | Deveney | 351/157 |

*Primary Examiner*—Hung Xuan Dang
*Attorney, Agent, or Firm*—Barlow, Josephs & Holmes, Ltd.

[57] ABSTRACT

A multi-purpose eyeglass retainer is provided which is capable of connecting to a temple of an eyeglass frame in multiple fashions. The retainer includes an elongated, flexible cord. A slipknot is formed on both of the free ends of the flexible cord. The retainer is connectable to eyeglass temples by slidably receiving the respective slipknots. The retainer is also capable of connecting to the free ends of the temples in a "sport-style" attachment using the same elongated, flexible cord. An adapter includes a hook member on one end and a post member on the other end. The slipknot of the elongated, flexible cord is removably connected to the hook member. A rubber tube member receives the free end of a temple end. The tube is removably connected to the post member. The elongated, flexible cord is adapted to connect to the free ends of the temples. The adapter and tube may be provided alone without the retainer cord for retrofitting to existing retainer cords that have a slipknot on a free end.

12 Claims, 4 Drawing Sheets

MULTI-PURPOSE EYEGLASS RETAINER

BACKGROUND OF THE INVENTION

The present invention relates generally to eyeglass retainers. More specifically, the present invention relates to an eyeglass retainer that can connect to an eyeglass temple in multiple ways.

In the optical, eyeglass and eyewear industry, retainers have been available for securing or retaining eyeglasses in place. For example, wearers of eyeglasses that frequently put on and take off their eyeglasses commonly employ a type of retainer that includes an elongated, flexible cord that has loops or slipknots at the respective free ends thereof. The slipknots open up to permit receipt of the eyeglass temple ends therethrough. The slipknots are then located in the desired position on the temples, such as near the front of the temples, and tightened to secured the cord ends in place. In addition, rubber loops have also been employed to secure the free ends of the cord to the eyeglass temples. With the cord secured in place, eyeglasses may be worn by the wearer without obstruction by the attached cord. When the glasses are not needed, the wearer simply removes the eyeglasses and lets them, for example, rest on their chest tethered with the cord secured thereto. The cord is commonly routed loosely about the neck of the wearer. As a result of this prior art retainer assembly, the eyeglasses are easily accessible for use.

While the foregoing type of eyeglass retainer is appropriate to prevent the loss of eyeglasses and for providing easy access, this type of retainer is not well-suited for maintaining the eyeglasses on the wearer during vigorous activity, such as during participation in athletic activity. In the prior art, various sport-type eyeglass retainers have been provided which address this problem. For example, a flexible cord or band is permanently provided with a rubber tube on each of the opposing free ends of the cord or band. The tubes frictionally engage the respective free end portions of the temples of the eyeglasses.

Since the foregoing two types of eyeglass retainers are fundamentally different in construction, a wearer must remove one type of eyeglass retainer and replace it with another to change the desired functionality of the retainer. The complete replacement of one retainer with another automatically replaces the elongated, flexible cord of the retainer with a new one because the cord is permanently connected to the respective slipknots or rubber tubing.

In view of the foregoing, there is a demand for an eyeglass retainer that is capable of retaining an eyeglass frame in a slipknot style at the front or middle of the temples as well as in a sport style where the free terminal ends of the temples are engaged to prevent unwanted removal of the eyeglasses. It would also be desirable for an eyeglass retainer to be easily interchangeable between the two types of connection to add flexibility of use.

SUMMARY OF THE INVENTION

The present invention preserves the advantages of prior art eyeglass retainer assemblies. In addition, it provides new advantages not found in currently available eyeglass retainers assemblies, and overcomes many disadvantages of such current available assemblies.

The invention is generally directed to a novel and unique multiple purpose eyeglass retainer. The eyeglass retainer of the present invention has particular application in providing flexibility in how an eyeglass retainer is connected to the temples of eyeglasses. The eyeglass retainer of the present invention has particular application in being retrofittable to existing slipknot type eyeglass retainers to provide an alternative attachment method. The present invention provides a multiple purpose eyeglass retainer that can attach both to the front or middle of a temple as well as to the free end of a temple.

The preferred embodiment of the present invention includes three primary members. The retainer includes an elongated, flexible cord. A slipknot is formed on one of the free ends of the flexible cord. The retainer is connectable to the temple by slidably receiving the slipknot. The retainer is also capable of connecting to the free end of a temple in a "sport-style" attachment using the same elongated, flexible cord. An adapter includes a hook member on one end and a post member on the other end. The slipknot of the elongated, flexible cord is removably connected to the hook member. A rubber tube member is provided which receives the free end of a temple end. The tube is removably connected to the post member. The elongated, flexible cord is adapted to connect to the free end of the temple. Alternatively, the adapter and tube may be provided alone without the retainer cord for retrofitting to existing retainer cords that have a slipknot on its free ends.

It is therefore an object of the present invention to provide a multi-purpose eyeglass retainer that can connect to eyeglass temples in both a slipknot style as well as a sport band style.

Another object of the present invention is to provide a multi-purpose eyeglass retainer that is easily convertible between a slipknot style connection and a sport band style connection.

Another object of the present invention is to provide a multi-purpose eyeglass retainer that is easy to manufacture.

It is a further object of the present invention to provide a multi-purpose eyeglass retainer that is easy to install and operate.

It is yet a further object of the present invention to provide a multi-purpose eyeglass adapter to quickly and easily adapt a slipknot style eyeglass retainer to connect to the free ends of eyeglass temples in a sport band type connection.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

DETAILED DESCRIPTION OF THE PREFERRED EMBODIMENT

Figure 1:
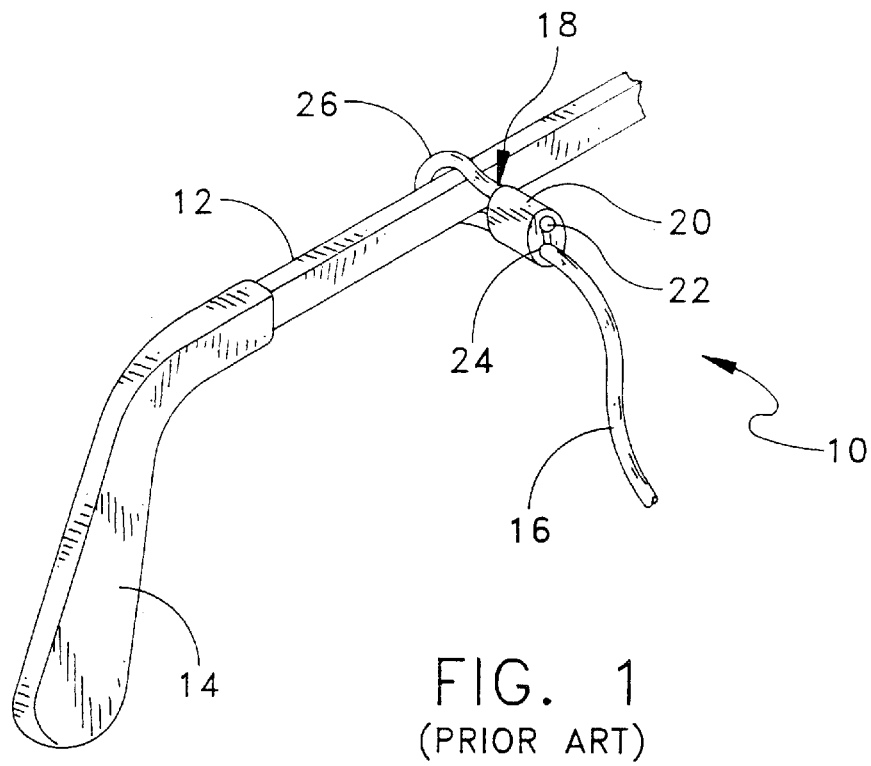
FIG. 1 is a perspective view of a prior art slipknot style eyeglass retainer shown installed on an eyeglass temple.

Referring to first to FIG. 1, a perspective view of the connection of a prior art eyeglass retainer 10 to a temple 12 of an eyeglass frame. For simplicity and ease of illustration, a single temple 12 is shown in each of the drawing Figures. It should be understood that an eyeglass retainer includes two of the connection assemblies discussed below, one for each of the two temples of an eyeglass frame. The second connection on the opposite side of an eyeglass retainer is not shown or discussed as it is identical to the assembly discussed below.

The prior art connection shown in FIG. 1 provides an eyeglass temple 12 with a temple end portion 14. An elongated, flexible cord 16 includes a slipknot 18 on both of its free ends. One of the slipknots 18 on one end of the cord 16 is 20 shown connected to the temple 12. The slipknot 18 includes an adjustment member 20 which has the free end 22 of the cord 16 secured therein with the cord 16 slidably routed through an aperture 24 proximal thereto. As a result, the loop 26 formed on the opposite side of the adjustment member 20 can be adjusted in size to accommodate the temple 12. For installation, the cord 16 is pulled to enlarge the loop 26 so that the temple end 14 can be inserted through the loop 26. When the loop 26 is located at the desired place on the temple 12, the cord 16 is pulled to tighten the loop 26 substantially in place and to prevent the cord 16 from slipping off of the end 14 of the temple 12. The slipknot 18 of the prior art device of FIG. 1, is shown to include an adjustment member 20; however, other types of knots and structures may be used to provide the slipknot functionality.

Figure 2:
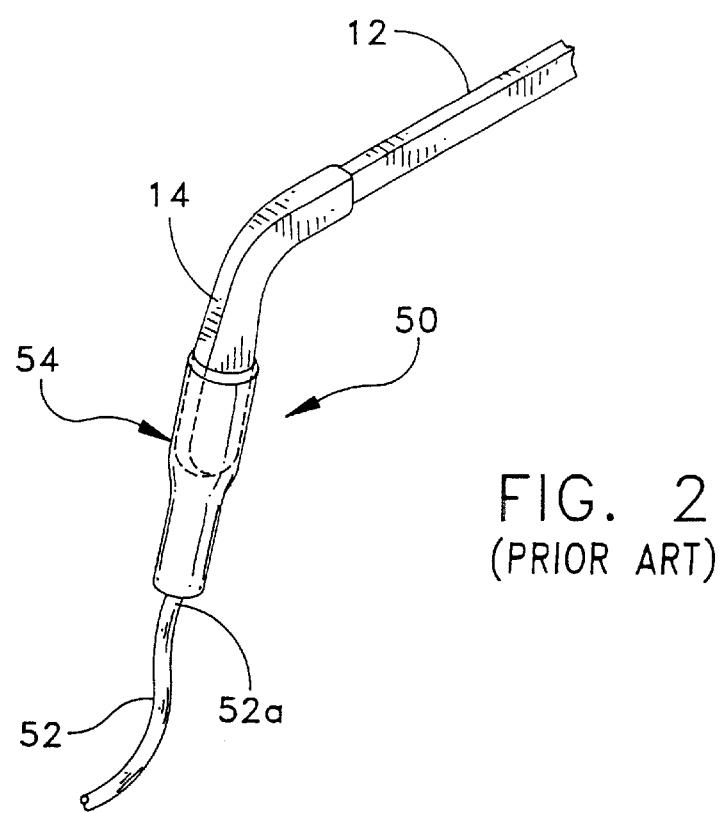
FIG. 2 is a perspective view of a prior art sport band style eyeglass retainer shown installed on an eyeglass temple.

FIG. 2 shows another prior art eyeglass retainer assembly 50. This assembly 50 provides for a sport band type connection where an elongated, flexible cord 52 includes a rubber tube 54 permanently affixed on its free end 52a. As shown in FIG. 2, the rubber tube 54 is slipped directly over the temple end 14 so that the tube 54 embraces at least a portion thereof. The inner dimension of the tube 54 is typically slightly smaller than the outer dimension of the temple end 14 so that the temple end 14 is frictionally engaged within the tube 54 to prevent easy removal. In this prior art assembly, the cord 52 is commonly shorter and/or in the form of a band and positioned close to the rear of the head of the wearer so as to provide a snug fit which is optimal for high activity, such as athletics.

Figure 3:
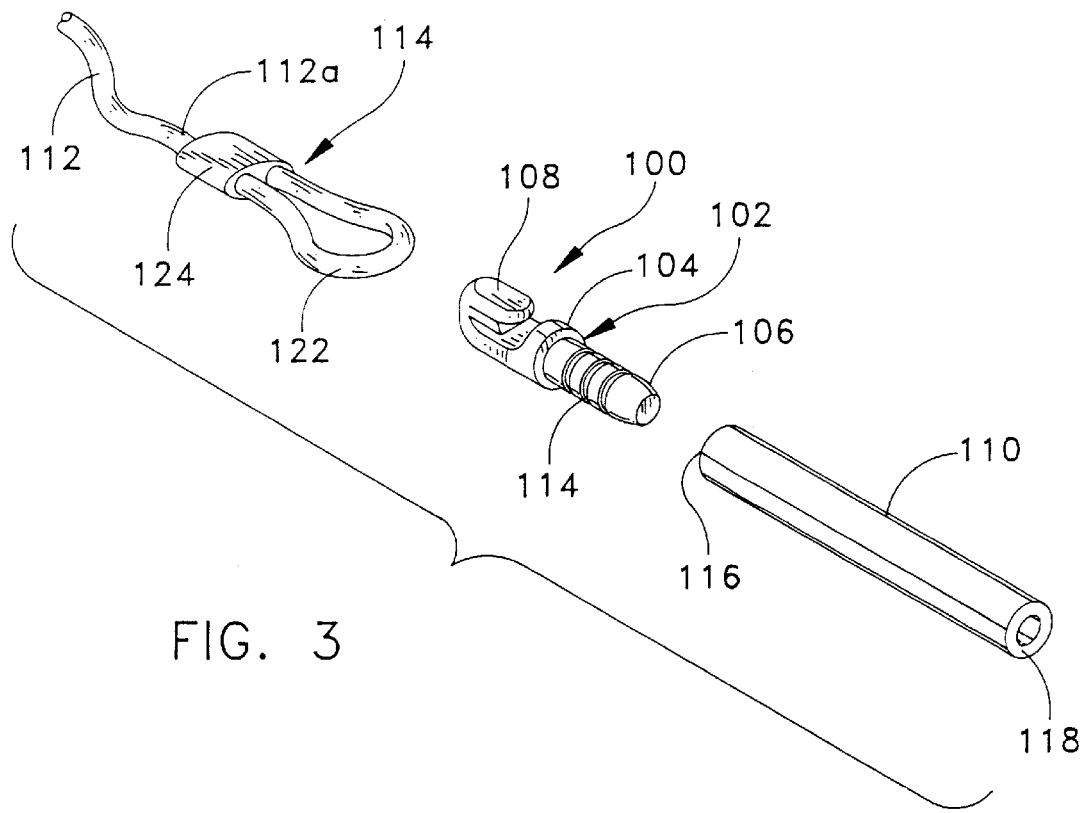
FIG. 3 is an exploded perspective view of the multi-purpose eyeglass retainer of the present invention.

Turning now to FIGS. 3-7, the multi-purpose eyeglass retainer 100 of the present invention is shown. The multi-purpose eyeglass retainer 100 combines the functionality of both of the prior art assemblies into a single device. In FIG. 3, an exploded perspective view of the multi-purpose eyeglass retainer 100 of the present invention is shown. A adapter member, generally referenced as 102, is included with a main body 104 with a post 106 on one end and an inwardly pointing hook member 108 on the other end. The adapter 102 interconnects a tube 110 to an elongated, flexible cord 112 with a slipknot 114 on its free end. The post 106 preferably includes a roughed surface 114 thereon, such as in the form of ridges, or the like.

Figure 4:
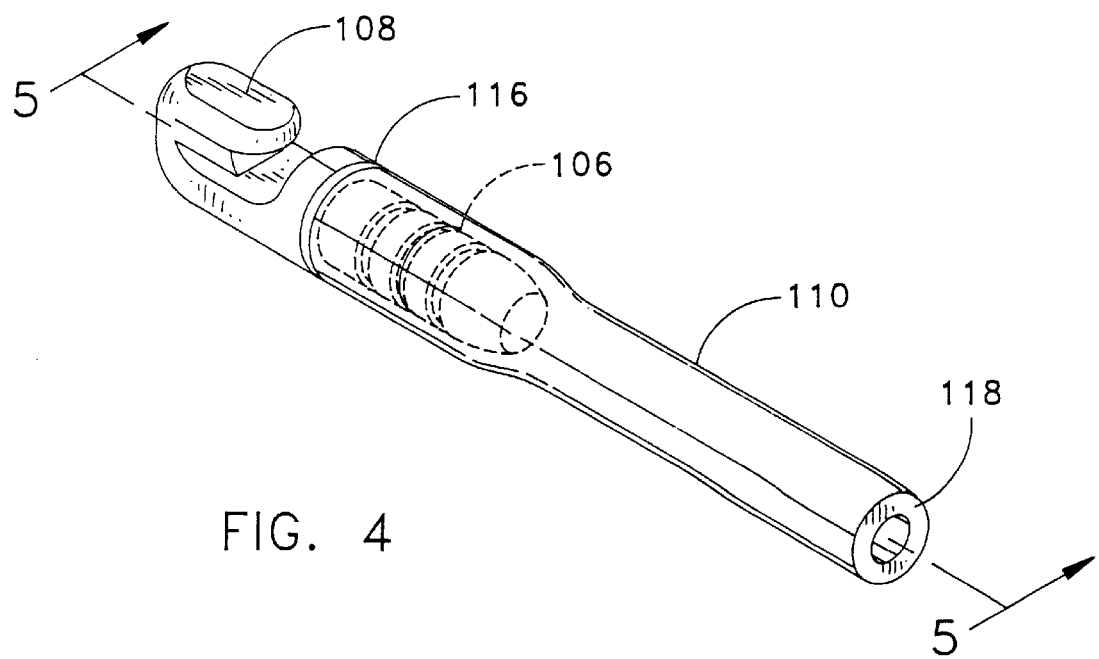
FIG. 4 is a perspective view of the adapter and tube of the present invention.
Figure 5:
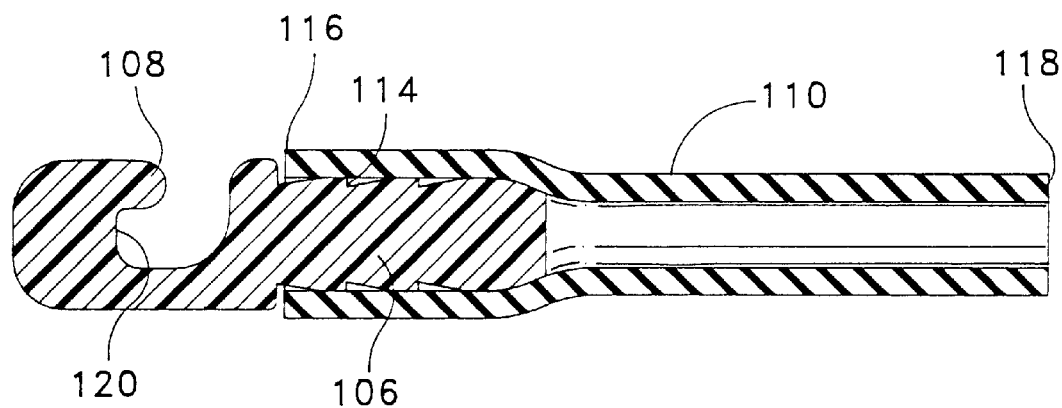
FIG. 5 is a cross-sectional view through the line 5—5 of FIG. 4.

In FIG. 4, installation of the tube 110 onto the adapter 102 is shown. The tube 110 includes two opposing free ends 116 and 118. Free end 116 is routed over the post 106 into frictional engagement therewith. As further illustrated in FIG. 5, a cross-sectional view through the line 5—5 of FIG. 4, the inner diameter of the tube 110 is smaller than the outer diameter of the post 106 so a snug, but removable, connection is made when the tube 110 is stretched over the post 106. The employment of the roughened surface or ridges 114 further enhances the removable frictional engagement of the tube 110 on the post 106 of the adapter 102.

Figure 6:
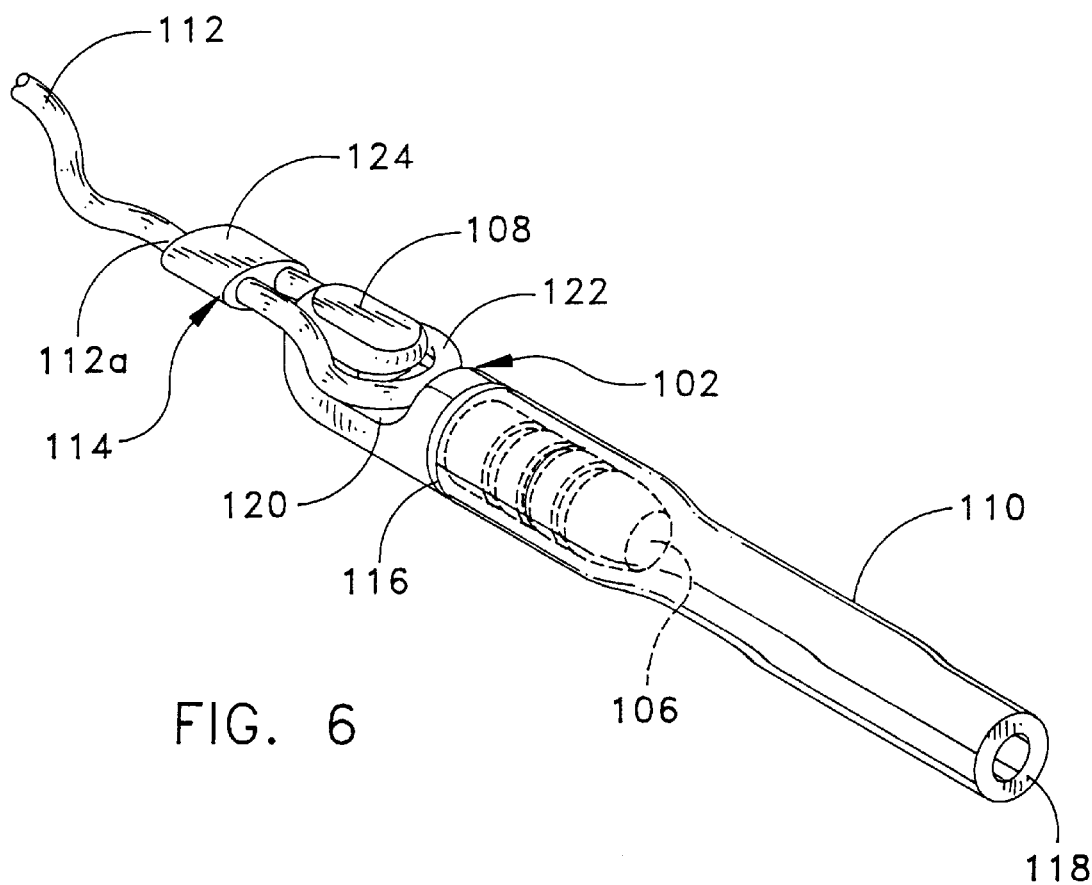
FIG. 6 is a perspective view of the attachment of the adapter to an eyeglass cord via the slipknot in accordance with the present invention.

In FIG. 6, the connection of the cord 112 to the adapter 102 via the slipknot 114 present on its free end 112a. The adapter 102 includes an upstanding hook member 108 that is generally inwardly positioned. The hook member 108 is defined by a notch 120 in the adapter 102 which is sized to be substantially similar to a loop 122 formed in the cord 112 by the slipknot 114. The hook member 108 may be sized and dimensioned to conform to the shape of loop 122. As shown, notch 120 is provided on one side of the hook member 108. Optionally, another notch (not shown) may be provided on the opposing side of hook member 108 to further secure and contain hook 122. Further, a continuous circumferential groove may be employed to contain loop 122. The slipknot 114 is loosened and the loop 122 is placed over the hook member 108 on the adapter and within the notch 120. The slipknot 114 is then tightened by pulling on the adjustment member 124. As a result, the cord 112 is removably secured to the adapter 102 and, thus, the tube 110, by the engagement of the loop 122 with the hook member 108. In view of the assembly shown in FIG. 6, the end 112a of the cord 112 has been effectively adapted to a tubular end to provide the capability of attachment to a temple end in a sport band type connection where the free ends of the temple are securely engaged.

Figure 7:
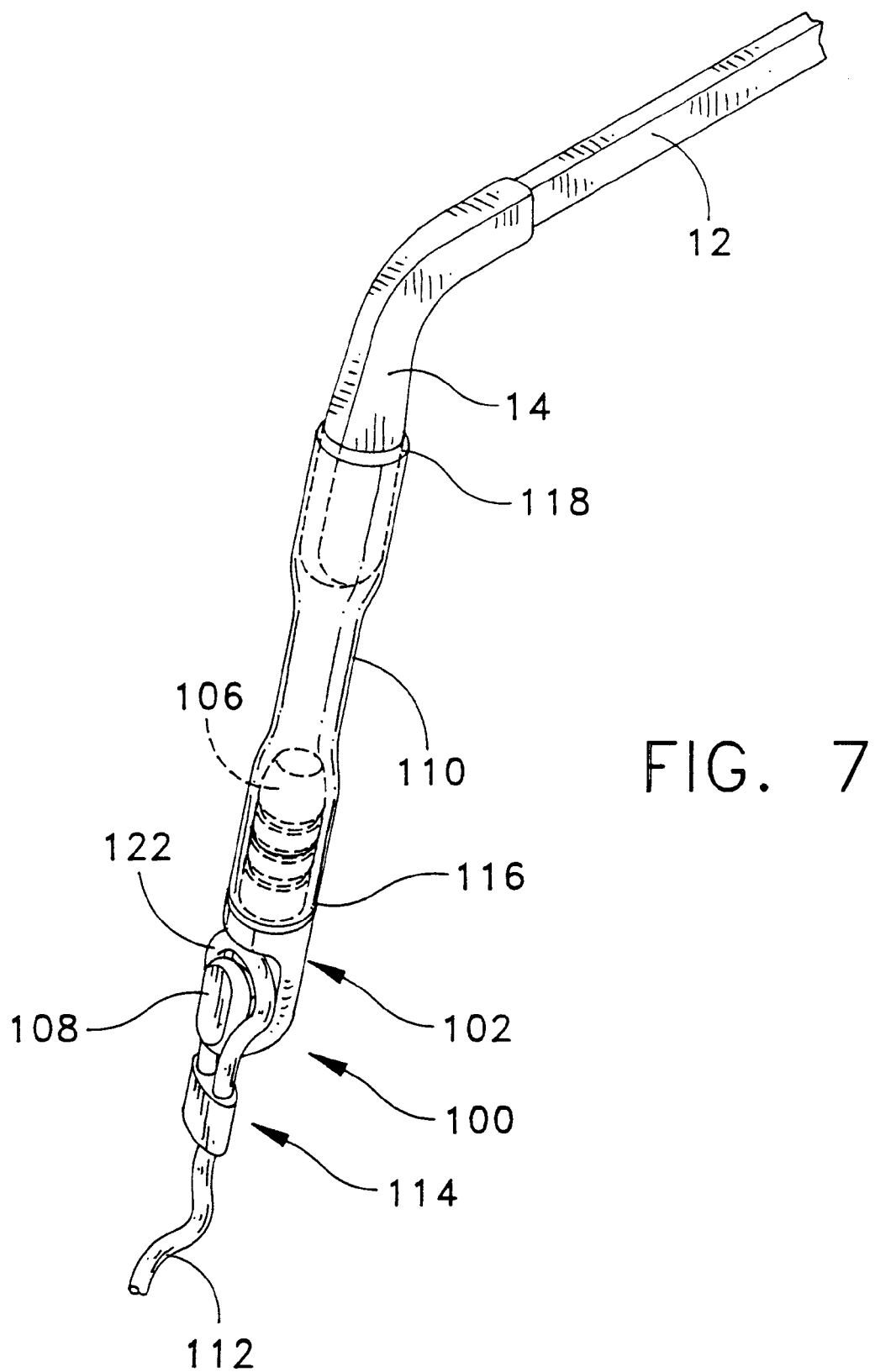
FIG. 7 is perspective view of the attachment of the multi-purpose eyeglass retainer to an eyeglass temple in a sport band style connection.

FIG. 7 illustrates use of the multi-purpose retainer 100 of the present invention. With the slipknot 114 of the cord 112 installed on the hook member 108 of adapter 102 and the tube 110 installed on post 106 of the adapter 102, free end 118 of the tube 110 can then be installed directly to the temple end 14 in a sport band type configuration. The cord 112 can then be shortened, if desired, using known methods to provide a true sport band eyeglass retainer. If the user desires a slipknot style connection, the loop 122 is simply loosened from the adapter 102 and then routed directly over the temple end 114 to realize a connection similar to that shown in FIG. 1 above.

With the present invention, the user has the flexibility to determine the type of retainer connection to the eyeglasses. The user can easily switch between types of connection while using the same cord 112. Preferably, the slipknot 114, cord 112, adapter 102 and tube 110 are provided as a single assembly for providing a complete multi-purpose eyeglass retainer 100. In addition, it is also envisioned that the adapter 102 and tube 110 be provided as a separate unit apart from the cord 112 and slipknot 114. In this condition, the adapter 102 and tube 110, of the present invention, are capable of retrofitting existing slipknot cords to a sport band style connection. The tube 110 is preferably silicone and the adapter 102 is preferably made of plastic for ease of manufacture, however other suitable material may be used. The cord 112 is preferably a textile material but may also be synthetic, cloth, rubber and/or band-like in configuration to suit the application at hand. A particular adjustment member 124 is shown to provide the slipknot functionality; however, other structures may be employed, such as a knot in the cord material itself. Also, a shrink-tube can be provided in place of the particular adjustment member 124 to form the slipknot 114.

It would be appreciated by those skilled in the art that various changes and modifications can be made to the illustrated embodiments without departing from the spirit of the present invention. All such modifications and changes are intended to be covered by the appended claims.

What is claimed is:

1. An adapter for connecting tube, having an inner diameter and for receiving an end of an eyeglass temple, to a slipknot, on a free end of an eyeglass retainer cord:

a main body having a first end and a second end;

a hook member connected to said first end of said main body; said slipknot being routable about said hook member thus securing said eyeglass retainer cord relative to said main body; and a post member, having an outer diameter, connected to said second end of said main body; said tube being frictionally slidable over said post member thus securing said tube relative to said main body.

2. The adapter of claim 1, wherein said post member further includes a roughened, friction increasing outer surface.

3. The adapter of claim 1, wherein said tube is made of rubber.

4. The adapter of claim 1, wherein said eyeglass retainer is flexible.

5. The adapter of claim 1, wherein said hook member extends in a direction toward said post member.

6. The adapter of claim 1, wherein said outer diameter of said post member is slightly larger than said inner diameter of said tube.

7. An adapter for connecting tube, for receiving an end of an eyeglass temple, to a slipknot, on a free end of an eyeglass retainer cord:

a main body having a first end and a second end;

hook means for securely receiving said slipknot connected to said first end of said main body; and post means for frictionally receiving said tube connected to said second end of said main body.

8. A multi-purpose eyeglass retainer connectable to a temple end, comprising:

an elongated, flexible cord having a free end;

a slipknot formed on said free end;

an adapter having a first end and a second end; a hook member connected to said first end; said elongated, flexible cord being removably connected to said hook member via said slipknot; a post member, having an outer diameter, connected to said second end; and a flexible tube, having a first end, a second end and an inner diameter; said first end of said tube being removably receivable on said post member and said second end of said tube being removably receivable on said temple end.

9. The adapter of claim 8, wherein said post member further includes a roughened, friction increasing outer surface.

10. The adapter of claim 8, wherein said tube is made of rubber.

11. The adapter of claim 8, wherein said hook member extends in a direction toward said post member.

12. The adapter of claim 8, wherein said outer diameter of said post member is slightly larger than said inner diameter of said tube.

* * * * *